United States Patent
Majid et al.

[11] Patent Number: 6,011,414
[45] Date of Patent: Jan. 4, 2000

[54] ARRANGEMENT FOR REDUCING THE EFFECTS OF CAPACITIVE COUPLING IN A CONTROL CIRCUIT FOR A SWITCHED-MODE POWER SUPPLY

[75] Inventors: Navid Majid, Mohegan Lake, N.Y.; Ton Mobers, Grave; Joan Wichard Strijker, Wijchen, both of Netherlands

[73] Assignee: Philips Electronics North America Corporation, New York, N.Y.

[21] Appl. No.: 09/017,920

[22] Filed: Feb. 3, 1998

[51] Int. Cl.[7] .................................................. G11C 27/02
[52] U.S. Cl. ............................................. 327/95; 327/94
[58] Field of Search ............................... 327/91–97, 110, 327/143, 198, 538, 312, 323; 341/122; 363/21, 41

[56] References Cited

U.S. PATENT DOCUMENTS

| | | | |
|---|---|---|---|
| 5,453,921 | 9/1995 | Shutts | 363/21 |
| 5,498,995 | 3/1996 | Szepesi et al. | 327/538 |
| 5,646,520 | 7/1997 | Frank et al. | 327/93 |
| 5,650,715 | 7/1997 | Massie | 363/21 |
| 5,874,841 | 2/1999 | Majid et al. | 327/94 |

*Primary Examiner*—Toan Tran
*Attorney, Agent, or Firm*—Edward W. Goodman

[57] ABSTRACT

In a switched-mode power supply, when the controller and the switching device are encapsulated together with a heat sink, in which the drain of the switching device is connected to the heat sink, the heat sink and the paths to the various pins of the controller forms various parasitic capacitances which, when the switching device switches injects inordinately large currents into the pins of the controller. In the case of the $D_{MAG}$ input, this may result in throwing the switched-mode power supply out of regulation. The sample-and-hold circuit connected to the $D_{MAG}$ input includes an additional comparator for comparing the current on the $D_{MAG}$ input to an extra large current. If the current on the $D_{MAG}$ input exceeds this extra large current, the sampling switch of the sample-and-hold circuit is held open while a clamp circuit is engaged on the $D_{MAG}$ input.

3 Claims, 6 Drawing Sheets

ARRANGEMENT FOR REDUCING THE EFFECTS OF CAPACITIVE COUPLING IN A CONTROL CIRCUIT FOR A SWITCHED-MODE POWER SUPPLY

BACKGROUND OF THE INVENTION

1. Field of The Invention

The subject invention relates to multi-chip modules for switched-mode power supplies.

2. Description of The Related Art

A switched-mode power supply, as disclosed in co-pending U.S. patent application Ser. No. 08/903,779, filed Jul. 31, 1997 (PHA 23,264), assigned to the Assignee of the subject application, includes a controller chip and a switching device for switching the power in a primary winding of a power transformer. In these supplies, the switching device and the controller chip are typically combined in a single encapsulated module, complete with a heat sink. The switching devices are typically vertical diffused MOSFETs (VDMOS) in which the drain is connected to the heat sink. As such, the connections to the various pins of the controller chip and the heat sink act as parasitic capacitors resulting in the application (and withdrawal) of induced currents to and from the pins of the controller chip. Depending on the functions of the affected pins, the operation of the controller chip may be seriously compromised.

One area of concern is the sample-and-hold portion of the controller chip. Co-pending U.S. patent application Ser. No. 08/901,491, filed Jul. 28, 1997 (PHA 23,262), assigned to the Assignee of the present invention, discloses a sample-and-hold circuit for a controller in a switched-mode power supply. In particular, the sample-and-hold circuit is used for sensing the output voltage of the switched-mode power supply and for regulating the switching device in controlling the output voltage. If a too large induced current is injected into the sample-and-hold circuit through an input pin of the controller, the sample-and-hold circuit interprets this induced current as an indication of an over-voltage in the output voltage of the switched-mode power supply. The sample-and-hold circuit then interrupts the switching of the switching device taking the switched-mode power supply out of regulation.

SUMMARY OF THE INVENTION

It is an object of the present invention to sense undesired induced currents in the controller of a switched-mode power supply and to prevent these induced current from taking the switched-mode power supply out of regulation.

The above object is achieved in a sample-and-hold circuit for a controller for controlling a switched-mode power supply having a transformer with a primary winding, an auxiliary winding and a secondary winding, and a switching device coupled in series with the primary winding, a voltage on said auxiliary winding being dependent on an output voltage on said secondary winding, said controller having an input coupled to said auxiliary winding for receiving a current proportional to said voltage, and a control terminal having a discharge capacitor coupling the control terminal to ground, the sample-and-hold circuit having an input coupled to the input of the controller for receiving said current, a first comparator for comparing said current to a first reference current, and a switch having an input coupled to receive said current, an output coupled to said control terminal of said controller, and a control input coupled to an output of said comparator, characterized in that said sample-and-hold circuit further comprises a second comparator for comparing said current to a second reference current, means, coupled to said second comparator, for opening said switch, said second reference current being larger than said first reference current, and switchable clamp means coupled to said input of said sample-and-hold circuit, said switchable clamp means having a control input coupled to an output of said second comparator, whereby, under normal operating conditions, when the input current exceeds said first reference current, said first comparator closes said switch causing said current to charge said discharge capacitor, and whereby under abnormal conditions in which capacitive coupling induces a large current in said input of said controller causing said current to exceed said second reference current, said means, in response to said second comparator, opens said switch, and the output from said second comparator activates said switchable clamp means.

Applicants recognized that the normal operation of the sample-and-hold circuit caused problems when faced with induced currents due to capacitive coupling. In particular, by monitoring the current at the $D_{MAG}$ input, the sample-and-hold circuit causes a voltage representing that on the auxiliary winding to be stored on a discharge capacitor connected to the $V_{CTRL}$ terminal. when the current at the $D_{MAG}$ input exceeds a first predetermined level, the sample-and-hold circuit charges the discharge capacitor to mirror the voltage at the $D_{MAG}$ input. The voltage across the discharge capacitor is then used to regulate the switching of the switching device. In order to prevent erroneous sampling, the $D_{MAG}$ current is compared to a second predetermined level which is greater than the first predetermined level, this second predetermined level being one which would ordinarily not be exceeded by the $D_{MAG}$ current. Once this level is exceeded, the sample-and-hold circuit suspends its sampling operation until the $D_{MAG}$ current drops below the second predetermined level. This effectively isolates the discharge capacitor from the capacitive coupling effect on the $D_{MAG}$ input.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
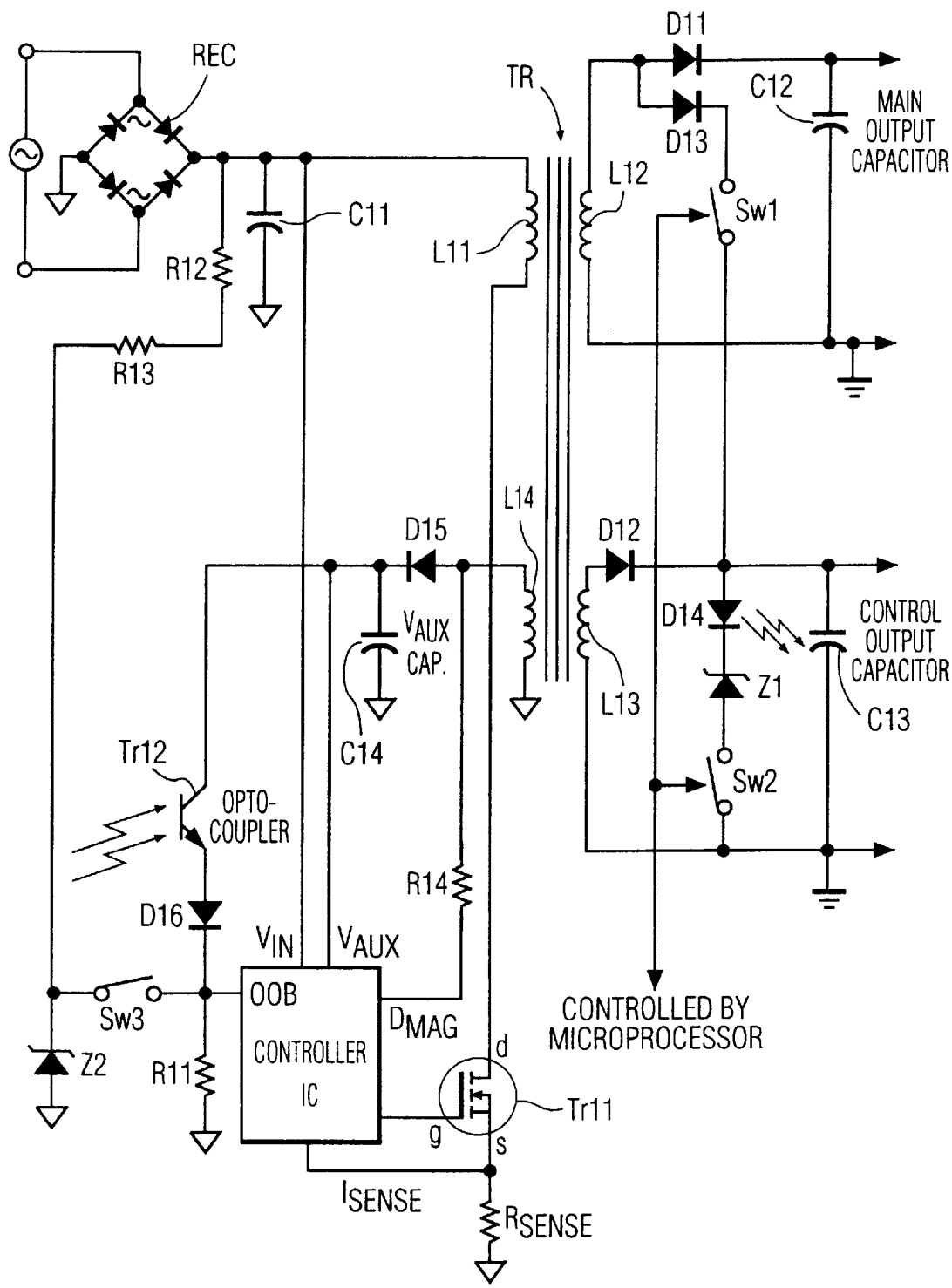
FIG. 1 is a circuit diagram of a switched-mode power supply.

FIG. 1 shows a schematic diagram of a known switched-mode power supply. In particular, a diode rectifier bridge REC is connected to a line voltage source. An output from the rectifier bridge REC is connected to ground through a capacitor C11 and to one end of a primary winding L11 of a transformer TR. The other end of primary winding L11 is connected to one terminal of a switching device Tr11, the other terminal of which being connected to ground through a sense resistor $R_{SENSE}$. A first secondary winding L12 of the transformer TR has a first end and a second end connected to each other through a series arrangement of a diode D11 and a main output capacitor C12, the second end of the first secondary winding L12 also being connected to ground. A load (not shown) may be connected across the main output capacitor C12.

The transformer TR also includes a second secondary winding L13 having a first end and a second end connected to each other through a series arrangement of a diode D12 and a control output capacitor C13, the second end of the second secondary winding L13 also being connected to ground. A microprocessor (not shown), for controlling, for example, a television receiver in which the switched-mode power supply circuit is installed, is connected across the control output capacitor C13 to receive operating power.

The first end of the first primary winding L12 is also connected via a diode D13 and a controllable switch Sw1 to one end of the control output capacitor C13, while the control output capacitor C13 is shunted by a series arrangement of a light emitting diode D14 of an opto-coupler, a Zener diode Z1 and a controllable switch Sw2. The controllable switches Sw1 and Sw2 are controlled by a signal from the microprocessor to initiate the stand-by mode of the switched-mode power supply circuit.

The transformer TR further includes an auxiliary primary winding L14 which has one end connected to a diode D15, and then to ground through a $V_{AUX}$ capacitor C14, to a $V_{AUX}$ input of a controller IC, and to one terminal of a light sensor Tr12 of the opto-coupler, the other terminal of the light sensor Tr12 being connected to ground via resistor R11, and to a stand-by mode detecting input (OOB) of the controller IC. In addition, a series arrangement of two resistors, R12 and R13, and a Zener diode Z2 connect the output of the rectifier bridge REC to ground. The junction between resistor R13 and Zener diode Z2 is connected to the OOB input via a power switch Sw3. The other end of the auxiliary primary winding L14 is connected to ground. The controller IC also has a $V_{IN}$ input connected to the output of the rectifier bridge REC, a $D_{MAG}$ input connected through a resistor R14 to the one end of the auxiliary primary winding L14, a driver output connected to the control input of switching device Tr11, and an $I_{SENSE}$ input connected to the resistor $R_{SENSE}$.

Figure 2:
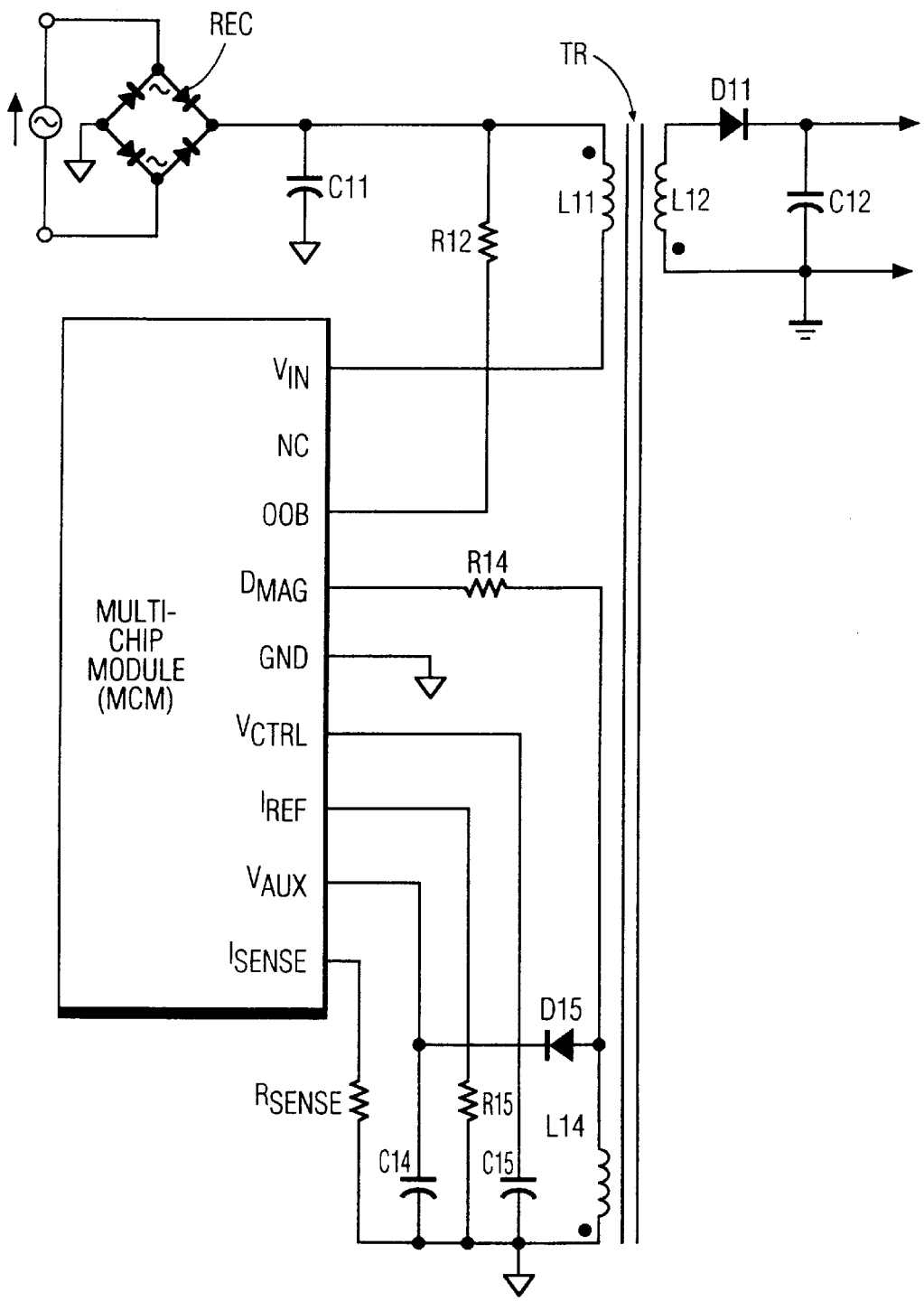
FIG. 2 is a simplified circuit diagram of relevant portions the above switched-mode power supply in which the controller IC and the switching device are combined in a multi-chip module.

FIG. 2 is a simplified schematic drawing of relevant portions of the switched-mode power supply of FIG. 1 in which several components, including the controller IC and the switching device Tr11 are combined and encapsulated forming a multi-chip module MCM. The MCM includes an $I_{REF}$ input connected to ground via a resistor R15, and a $V_{CTRL}$ input connected to ground via a discharge capacitor C15.

Figure 3:
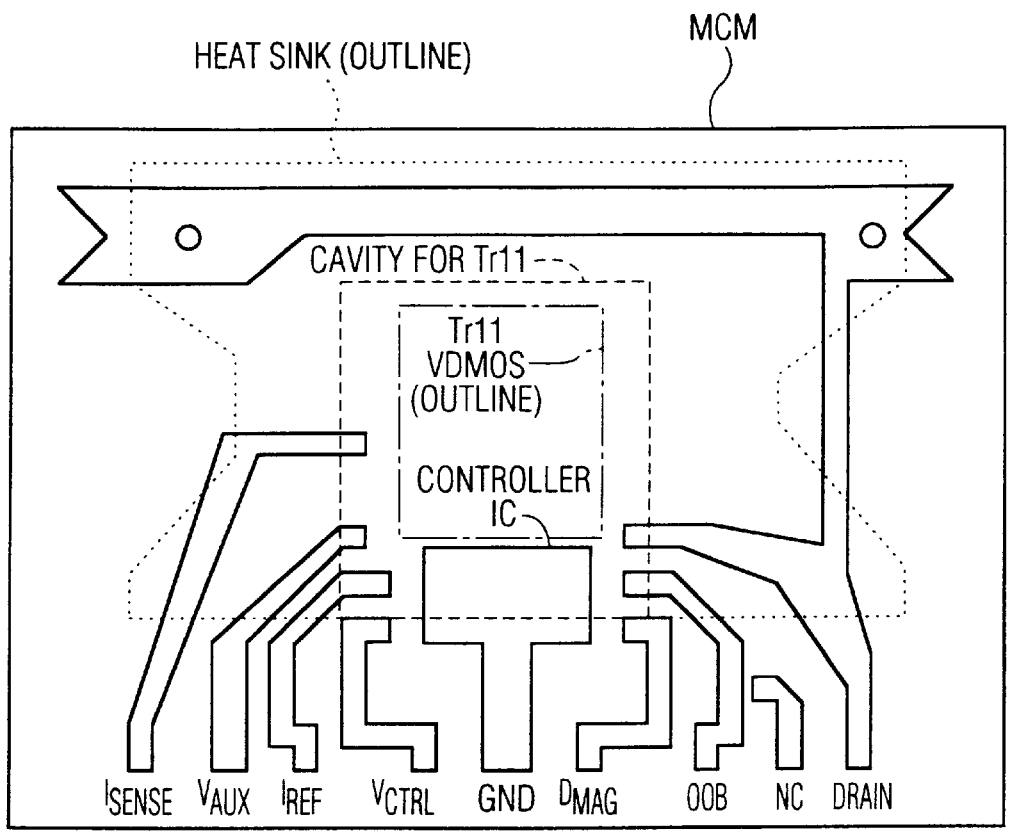
FIG. 3 is a view showing the arrangement of the components in the multi-chip module.
Figure 4:
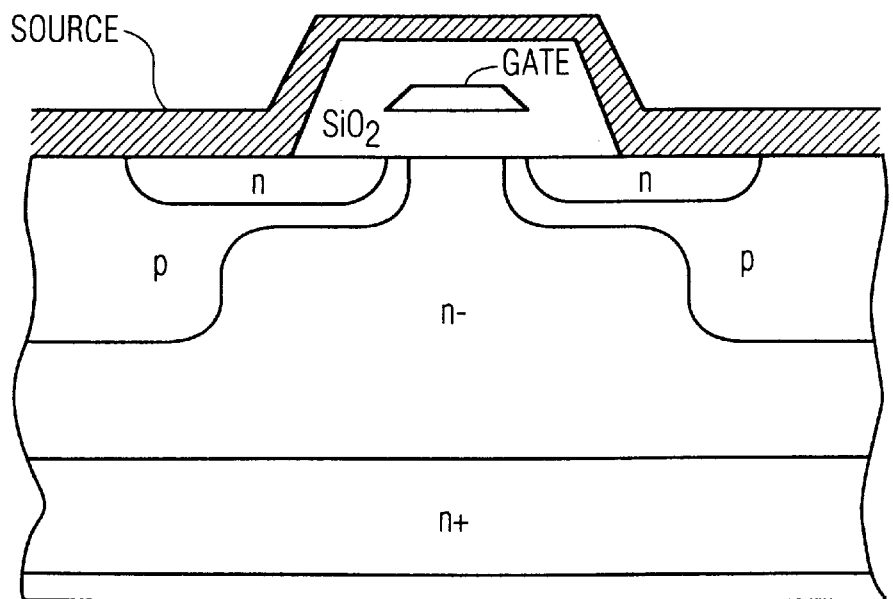
FIG. 4 is a cross-sectional view of the switching device.

FIG. 3 is a view of the MCM, partly in section, showing the arrangement of the components therein. The switching device Tr11, which, in this case is a vertical diffused MOSFET (VDMOS), includes a heat sink to which the drain is connected. As shown in FIG. 4, the heat sink/drain forms substantially the entire back plane of the VDMOS. The arrangement of the heat sink, the non-conductive encapsulating material and the paths to the various connections of the controller form parasitic capacitors which induce currents in the various connections. In particular, referring to FIG. 1, the drain of the switching device Tr11, when the switching device Tr11 is switched off, may reach voltages as high as 650 V. Since the heat sink is at the same potential as the drain of the switching device Tr11, the heat sink then, at times, is at 650 V. The change in voltage with respect to time (dv/dt) when the switching device Tr11 switches is usually very high, with typical values between 1 kV/gsec to 5 kV/Asec, depending upon the value of the drain snubber circuit (not shown). As the drain voltage goes up and down at a high dv/dt, a large capacitive current is either injected into or drawn out of the chip paths or components connected to the paths due to the presence of the parasitic capacitance. This current is not negligible and disturbs the operation of the chip.

Figure 5:
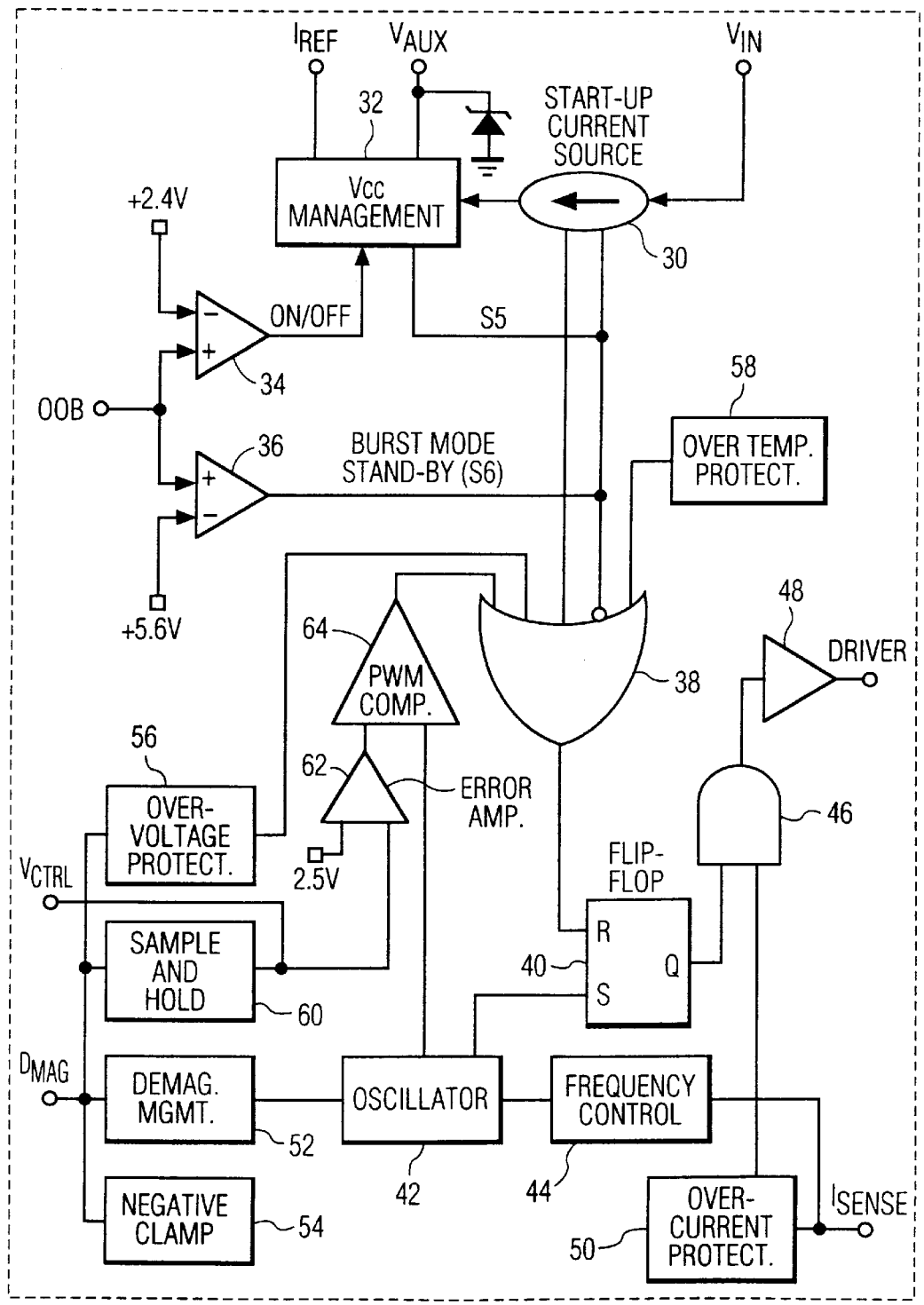
FIG. 5 is a block diagram of the controller IC.

FIG. 5 shows a block diagram of the controller IC. The controller IC includes a start-up current source 30 coupled to the $V_{IN}$ input and a Vcc management circuit 32 connected to the $V_{AUX}$ and $I_{REF}$ inputs. The OOB input is connected to a first comparator 34 for comparing the voltage thereon to +2.4 V, and generates an "OFF/ON" signal. This OFF/ON signal is applied to an input of the Vcc management circuit 32. The OOB input is also connected to a second comparator 36 for comparing the voltage thereon to +5.6 V, for generating a "Burst Mode Stand-by" signal S6. This signal S6 is applied to the start-up current source 30 and to a first input of an OR-gate 38. An output (S5) from the Vcc management circuit 32 is also applied to the start-up current source 30 and to an inverting second input of OR-gate 38. An output from OR-gate 38 is applied to the reset input of an RS flip-flop 40, the set input being connected to an output of an oscillator 42 which is connected to the output of a frequency control circuit 44 having an input connected to the $I_{SENSE}$ input. The Q output from the RS flip-flop 40 is connected to one input of an AND-gate 46 which has an output connected to a driver 48 for driving the switching device Tr11. The other input of the AND-gate 46 is connected to the output of an over-current protection circuit 50 which monitors the current through the VDMOS via the $I_{SENSE}$ input. The $D_{MAG}$ input is connected to a demagnetization management circuit 52 and a negative clamp 54 for protection against saturation of the inductor in the power supply. The presence of demagnetization protection guarantees discontinuous conduction mode operation which simplifies the design of feedback control and gives faster transient response for the system. An output from the demagnetization management circuit 52 is connected to the oscillator 42. In addition, the $D_{MAG}$ input is connected to an over-voltage protection circuit 56 having an output connected to a third input of the OR-gate 38, which also has a fourth input connected to the output of an over-temperature protection circuit 58.

The $D_{MAG}$ input is also connected to a sample-and-hold circuit 60 the output of which is connected to the $V_{CTRL}$ input of the controller IC and to one input of an error amplifier 62 which receives a 2.5 V. reference voltage at another input. The output from the error amplifier 62 is connected to one input of a pulse width modulation (PWM) comparator 64 which receives an output from the oscillator 42 at a second input. The output from the PWM comparator 64 is connected to a fifth input of the OR-gate 38.

Figure 6:
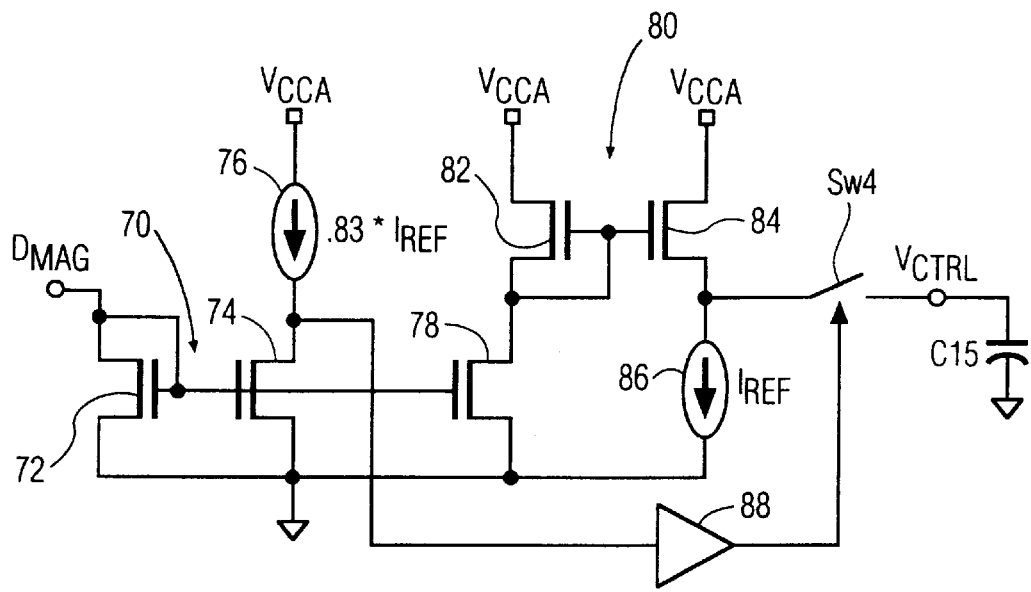
FIG. 6 is a schematic diagram of a known sample-and-hold circuit.

FIG. 6 shows a schematic diagram of a sample-and-hold circuit disclosed in co-pending U.S. patent application Ser. No. 08/901,491, filed Jul. 28, 1997 (PHA 23,262), assigned to the Assignee of the present invention. The $D_{MAG}$ input is connected to a current mirror 70 including MOSFETs 72 and 74 having interconnected gates and sources. In particular, the $D_{MAG}$ input is connected to the drain of MOSFET 72 which is connected to the interconnected gates. The interconnected sources of the MOSFETs 72 and 74 are connected to ground. Reference voltage $V_{CCA}$ is applied to a current source 76 which provide the current $0.83*I_{REF}$ to the drain of MOSFET 74. MOSFET 78, having its gate and source connected to the interconnected gates and sources, respectively, of MOSFETs 72 and 74, mirrors the current in current mirror 70 to current mirror 80 in which the drain of MOSFET 78 is connected to the source of MOSFET 82. The gates of MOSFETs 82 and 84 are interconnected while the drains of MOSFETs 82 and 84 receive the reference voltage $V_{CCA}$. The source of MOSFET 82 is connected to its gate. The source of MOSFET 84 is connected to ground through current source 86 which provides the current $I_{REF}$, and to one terminal of switch Sw4. The other terminal of switch Sw4 is connected to the terminal $V_{CTRL}$ which is connected to ground via the discharge capacitor C15. A first comparator 88 compares the current in current mirror 70 with the current provided by the current source 76 and when this current is exceeded, applies a signal closing the switch Sw4.

Figure 8A:
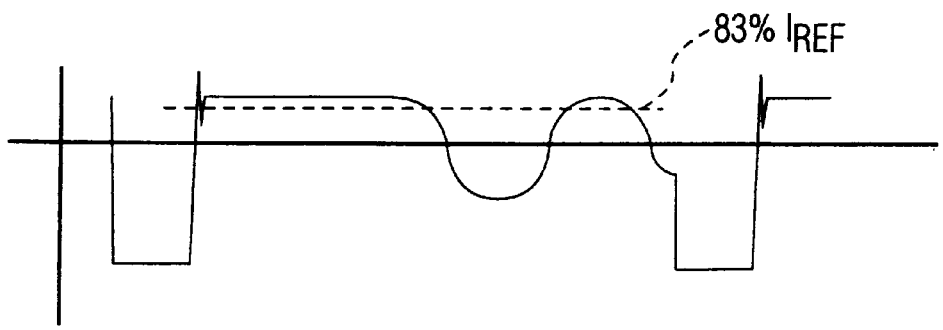
FIG. 8A shows a waveform of the voltage on the auxiliary winding.
Figure 8B:
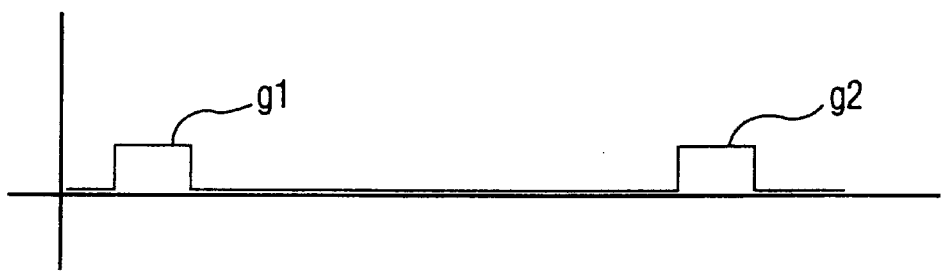
FIG. 8B shows a waveform of the gate drive of the switching device.

The operation of the switch Sw4 is dependent on the current injected into the $D_{MAG}$ input. This current is derived from the voltage on the auxiliary coil L14 via the resistor R14. FIG. 8A shows the voltage on the auxiliary coil L14. At the end of the gate pulse g1, shown in FIG. 8B, the switching device Tr11 turns off and the voltage in the auxiliary coil L14 rapidly rises. When the corresponding current rises above $0.83*I_{REF}$, the first comparator 88 closes the switch Sw4 causing the current in the current mirror 80 to charge the discharge capacitor C15. The voltage on the discharge capacitor C15 then controls, through the error amplifier 62, the PWM comparator 64, the OR-gate 38, the flip-flop 40, the AND-gate 46, and the amplifier 48, the operation of the switching device Tr11. In the event of capacitive coupling, when the switching device Tr11 opens, due to the sharp change in voltage on the drain, a large current is induced in the $D_{MAG}$ input. This overly large current is then used to charge the capacitor C15 to an overly large voltage. This overly large voltage then adversely affects the regulation of the switching device Tr11.

Figure 7:
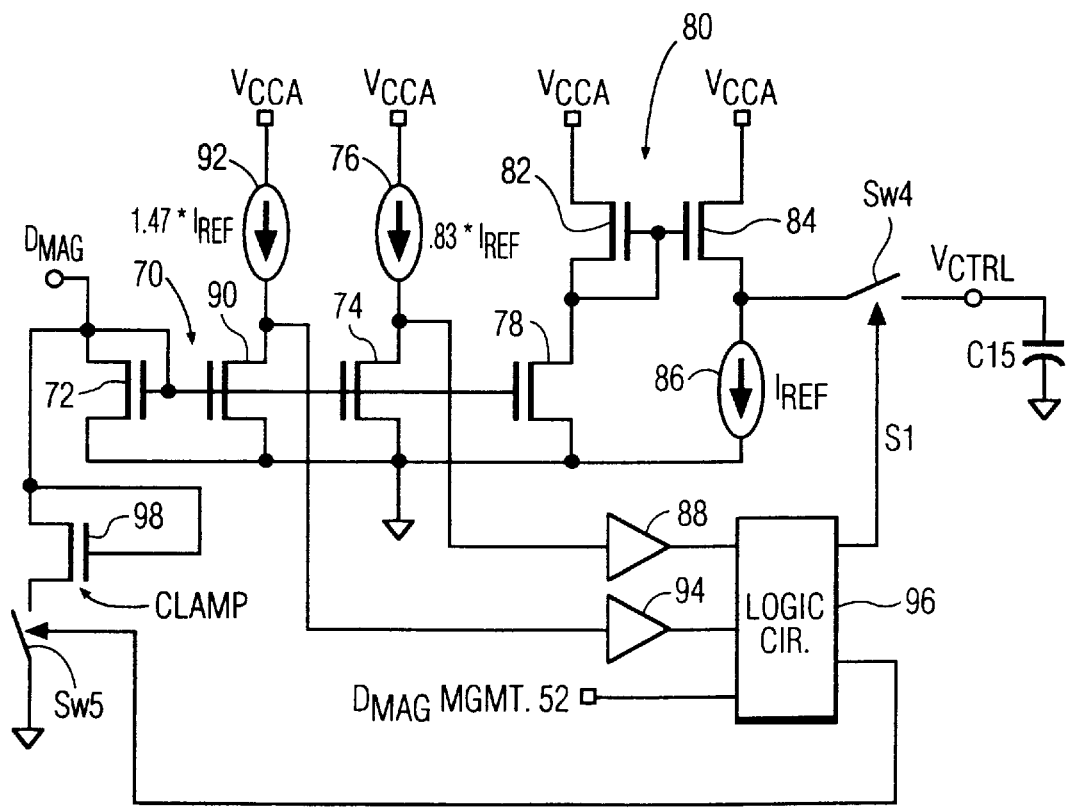
FIG. 7 is a schematic diagram of the sample-and-hold circuit of the subject invention.

FIG. 7 shows a schematic diagram of the sample-and-hold circuit of the subject invention. This sample-and-hold circuit is substantially similar to that of FIG. 6 except that this sample-and-hold circuit further includes MOSFET 90 having its gate and source connected, respectively, to the interconnected gates and sources of MOSFETs 72 and 74. Reference voltage $V_{CCA}$ is applied to current source 92 which supplies the current $1.47*I_{REF}$ to the drain of MOSFET 90. The drain of MOSFET 90 is also connected to a second comparator 94 which is, in turn, connected to a first input of a logic circuit 96 having a first input connected to the output of the first comparator 88. A third input of the logic circuit 96 receives the demagnetization management circuit 52 output signal. A first output of the logic circuit 96 is connected to the control input of the switch Sw4. A clamp is provided and includes a MOSFET 98 which has its interconnected gate and drain connected to the $D_{MAG}$ input. The source of MOSFET 98 is connected to ground via a switch Sw5. A second output of the logic circuit 96 is connected to a control input of switch Sw5.

Figure 8C:
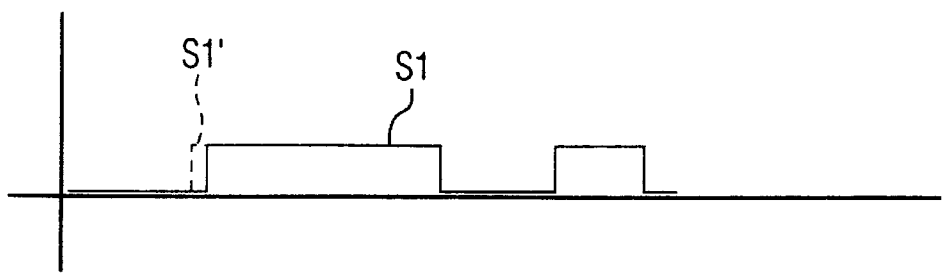
FIG. 8C shows a waveform of the switching signal output of the logic circuit.

During normal operation, the logic circuit 96 controls the switch Sw4 in conformance with the signal from the first comparator 88. However, when, due to capacitive coupling, the current into the $D_{MAG}$ input exceed $1.47*I_{REF}$, the second comparator 94 causes the logic circuit 96 to keep the switch Sw4 open and, at the same time, to close switch Sw5. This allows the excess current into the $D_{MAG}$ input to drain. When this current drops below $1.47*I_{REF}$, the logic circuit 96 opens switch Sw5 and closes Sw4, and the sample-and-hold circuit resumes normal operation. In FIG. 8C, the dotted area S1' of the switching signal S1 shows the suspended operation due to the logic circuit 96.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A sample-and-hold circuit for a controller for controlling a switched-mode power supply having a transformer with a primary winding, an auxiliary winding and a secondary winding, and a switching transistor coupled in series with the primary winding, a voltage on said auxiliary winding being dependent on an output voltage on said secondary winding, said controller having an input coupled to said auxiliary winding for receiving a current proportional to said voltage, and a control terminal having a discharge capacitor coupling the control terminal to ground, the sample-and-hold circuit having an input coupled to the input of the controller for receiving said current, a first comparator for comparing said current to a first reference current, and a controllable switch having an input coupled to receive said current, an output coupled to said control terminal of said controller, and a control input coupled to an output of said first comparator, characterized in that said sample-and-hold circuit further comprises a second comparator for comparing said current to a second reference current, means, coupled to an output of said second comparator, for opening said controllable switch, said second reference current being larger than said first reference current, and switchable clamp means coupled to said input of said sample-and-hold circuit, said switchable clamp means having a control input coupled to an output of said second comparator, whereby, under normal operating conditions, when the input current exceeds said first reference current, said first comparator closes said controllable switch thereby causing said current to charge said discharge capacitor, and whereby under abnormal conditions in which capacitive coupling induces a large current in said input of said controller causing said current to exceed said second reference current, said means, in response to said second comparator, opens said controllable switch, and the output from said second comparator activates said switchable clamp means.

2. A sample-and-hold circuit as claimed in claim 1, characterized in that said controllable clamp means comprises a MOSFET having a gate and drain connected to said input, and a further controllable switch connecting a source of said MOSFET to ground.

3. A sample-and-hold circuit as claimed in claim 1, characterized in that said sample-and-hold circuit further comprises a logic circuit having a first input coupled to the output of said first comparator and a second input coupled to the output of said second comparator, said logic circuit further having a first output coupled to said controllable switch and a second output coupled to said controllable clamp means.

* * * * *